(12) United States Patent
Hackett et al.

(10) Patent No.: US 6,438,170 B1
(45) Date of Patent: Aug. 20, 2002

(54) METHOD AND APPARATUS FOR MOTION ESTIMATION USING BLOCK MATCHING

(75) Inventors: Andrew Hackett, Klingenthal (FR); Michael Knee, Petersfield (GB); Michel Kerdranvat, Bischoffsheim; Nadine Bolender, Strasbourg, both of (FR)

(73) Assignee: Thomson Licensing S.A., Boulogne Cedex (FR)

( * ) Notice: Subject to any disclaimer, the term of this patent is extended or adjusted under 35 U.S.C. 154(b) by 1325 days.

(21) Appl. No.: 08/801,610

(22) Filed: Feb. 18, 1997

Related U.S. Application Data

(63) Continuation of application No. 08/303,337, filed on Sep. 8, 1994, now abandoned.

(30) Foreign Application Priority Data

Sep. 8, 1993 (FR) ........................................ EP93402188
Nov. 2, 1993 (DE) ........................................ EP93117661

(51) Int. Cl.⁷ .................................................. H04N 7/32
(52) U.S. Cl. ................................................... 375/240.16
(58) Field of Search ............................... 348/384, 390, 348/402, 407, 413, 416, 420, 429, 699; 375/240.01, 240.12, 240.16, 240.24; H04N 7/137, 7/32

(56) References Cited

U.S. PATENT DOCUMENTS

| | | | |
|---|---|---|---|
| 4,668,986 A | * 5/1987 | Furukawa | 348/416 |
| 4,689,673 A | * 8/1987 | Ohki et al. | 348/416 |
| 4,777,530 A | * 10/1988 | Kondo | 348/416 |
| 4,796,087 A | * 1/1989 | Guichard et al. | 348/402 |
| 4,864,394 A | * 9/1989 | Gillard | 348/699 |
| 4,901,149 A | * 2/1990 | Fernando et al. | 348/429 |
| 5,019,901 A | * 5/1991 | Vomori et al. | 348/699 |
| 5,021,879 A | * 6/1991 | Vogel | 348/402 |
| 5,162,907 A | 11/1992 | Keating et al. | |
| 5,347,309 A | * 9/1994 | Takahashi | 348/420 |

\* cited by examiner

Primary Examiner—Richard Lee
(74) Attorney, Agent, or Firm—Joseph S. Tripoli; Ronald H. Kurdyla; Guy H. Eriksen

(57) ABSTRACT

Block matching is a robust and simple method of motion estimation for television pictures. One important parameter in block matching is the block size. Large blocks give more reliable motion estimation than small blocks, particularly in the presence of noise on the input picture, but they produce a coarser motion vector field. However, if the motion estimation is being used for motion compensated interpolation, for example the upconversion between 50 and 100 Hz display rates, the effects on picture quality of wrong vectors for whole blocks, and also of vectors that do not correctly follow the boundaries of moving objects, can be severe. According to the invention, large block (LB) matching is combined with the performance of more localized motion vectors to get pixel motion vectors. For any pixel, the motion vector will be one of four possibilities; the vector calculated for the block containing the pixel and the vectors (V1, V2, V3, V4) of the nearest blocks horizontally, vertically and diagonally.

11 Claims, 3 Drawing Sheets

METHOD AND APPARATUS FOR MOTION ESTIMATION USING BLOCK MATCHING

This is a continuation of application Ser. No. 08/303,337, filed Sep. 8, 1994, now abandoned.

FIELD OF THE INVENTION

The present invention relates to a method and to an apparatus for motion estimation using block matching.

BACKGROUND OF THE INVENTION

Block matching is well known as a robust and intuitively simple method of motion estimation for television pictures. One important parameter in block matching is the block size. Large blocks give more reliable motion estimation than small blocks, particularly in the presence of noise on the input picture, but they produce a coarser motion vector field. If the goal of the motion estimation is to provide a motion compensated prediction, for example in bit rate reduction applications, a suitable compromise can usually be found, bearing in mind the fact that neither reliability nor a fine motion vector field are necessary conditions for good performance since occasional errors can be tolerated. If, however, the motion estimation is being used for motion compensated interpolation, for example for up-conversion between 50 and 100 Hz display rates, the effects on picture quality of wrong vectors for whole blocks, and also of vectors that do not correctly follow the boundaries of moving objects, can be severe.

SUMMARY OF THE INVENTION

It is one object of the invention to disclose a method by which the reliability advantages of a large block size are combined with the performance of more localized motion vectors. It is a further object of the invention to disclose an apparatus which utilizes the inventive method.

The inventive solutions are slightly different, but are all based on block matching using large blocks, followed by post-processing in which the boundaries between motion vectors are fixed more precisely or 'localized'.

As depicted in FIG. 1, the picture is divided into large rectangular blocks LB ($x_b$, $Y_b$), where $x_b$ is a horizontal coordinate increasing from left to right and $Y_b$ a vertical coordinate increasing from top to bottom of the picture. In the descriptions below, the block size is supposed to be M pixels by N lines. Typical block sizes are 8×8, 16×8 or 16×16. The block matching may be carried out either on a subsampled image or as described in EP93 402059 of the applicant or on the original, and may be either conventional or 'two sided', wherein the block to be interpolated is matched with a previous and a subsequent picture, as described in EP93 402187 of the applicant. The block matching process yields an error value $E(v_x, v_y)$ for each candidate motion vector ($v_x$, $v_y$). The motion vector chosen for the block is the one for which the error is a minimum.

The aim of the localization process is to produce a separate motion vector for each pixel. One feature that is common to all the localization methods that is that, for any pixel, the motion vector will be on of four possibilities: the vector calculated for the block containing the pixel and the vectors of the nearest blocks horizontally, vertically and diagonally, as illustrated in FIG. 1.

The pixels for which the choice will be made from a given set of vectors form an offset block RMLV, shown in the figure by a broken line. In this region, localized motion vectors are chosen from the vectors V1, V2, V3 and V4 of the corresponding adjacent large blocks.

In principle, the inventive method is suited for motion estimation using block matching, wherein a motion vector related to each block is calculated and wherein for any pixel of the current block, a pixel motion vector is calculated using four motion vectors, that is the motion vector of the current block and the motion vector of three adjacent blocks, whereby for any pixel, from error values related to said four block motion vectors several estimated errors are calculated, taking into account the position of the pixel relative to the centre of each of the corresponding block, whereby the minimum of said estimated errors is taken to select the related of said four block motion vectors as the final motion vector for said pixel, or whereby in addition, for each pixel a pixel matching is performed by comparing said four motion vectors, followed by counting in rows the number of choices from the left, respectively right, pair of blocks and by counting in columns the number of choices from the upper, respectively lower, pair of blocks and re-ordering the vectors to form groups of identical vector types in such a way, that every pixel has two decisions which together define a unique motion vector for the pixel, or whereby in addition, for each subblock smaller than said block a subblock matching is performed by comparing said four motion vectors relevant to the subblock and selecting one with respect to a minimum subblock error, whereafter a dominant subblock vector is generated from the selected vectors by combining them.

In principle, a first embodiment of the inventive apparatus for motion estimation using block matching, wherein a motion vector related to each block of a picture signal is calculated, includes:

- large-block matching means receiving said picture signal and producing block motion vectors and related block errors;
- memory means which store said block motion vectors and said error;
- error estimation means, in particular linear error interpolation means, which operate on stored error values corresponding to each four related block motion vectors, that is the motion vector of the current block and the motion vectors of the three adjacent blocks, and which calculate for each pixel estimated errors, taking into account the position of the pixel relative to the centre of each of the corresponding block;
- comparing means which take the minimum of said estimated errors;
- selecting means for selecting in relation to said minimum the respective of said four block motion vectors as a final motion vector for the current pixel.

In principle, a second embodiment of the inventive apparatus for motion estimation using block matching, wherein a motion vector related to each block of a picture signal is calculated, includes:

- large-block matching means receiving said picture signal and producing block motion vectors;
- memory means which store said block motion vectors;
- pixel matching means which compare each four of said stored block motion vectors, that is the motion vector of the current block and the motion vectors of the three adjacent blocks;
- count means for counting in rows the number of vector choices from the left, respectively right, pair of blocks and by counting in columns the number of vector choices from the upper, respectively lower, pair of blocks and for re-ordering the vectors to form groups of identical vector types in such a way, that every pixel has two decisions; and assigning means which combine said two decisions for defining a unique motion vector for each pixel, selected from the corresponding block motion vectors.

In principle, a third embodiment of the inventive apparatus for motion estimation using block matching, wherein a motion vector related to each block of a picture signal is calculated, includes:

large-block matching means receiving said picture signal and producing block motion vectors;

memory means which store said block motion vectors;

subblock matching means which compare each four of said stored block motion vectors, that is the motion vector of the current block and the motion vectors of the three adjacent blocks to select a vector which has a minimum subblock error;

combining means, in particular median filter means, which generate a dominant subblock vector from said selected vectors.

BRIEF DESCRIPTION OF THE DRAWINGS

The invention is illustrated in the accompanying drawing, wherein.

DETAILED DESCRIPTION

In the following description three embodiments of the invention will be described illustrating localization by error interpolation, by vote counting and by subblock matching.

Localization by Error Interpolation

This embodiment works by calculating an estimated error for each pixel for each of the four motion vectors from which the choice will be made, and then choosing the vector for which the estimated error is a minimum. For each of the four vectors the estimated error is calculated by linear interpolation between the block matching errors produced for each of the four blocks concerned, taking into account the position of the pixel in question relative to the centre of each block. For example, if the horizontal distance of the pixel from the centre of the upper left block is A and its vertical distance B, the motion vector is $V_n$ and the errors from each of the four blocks are $E_1(v)$, $E_3(v)$ and $E_4(v)$, the estimated error for the pixel is:

$$EE_n = (1-A/M)*(1-B/N)*E_1 + (A/M)*(1-B/N)*E_2$$
$$+ (1-A/M)*(B/N)*E_3 + (A/M)*(B/N)*E_4$$

This method extends the areas for which block matching errors are likely to be small, thereby achieving a better match between the motion vectors and objects moving with different velocities, while preserving the continuity of the boundaries between motion vectors.

Figure 2:
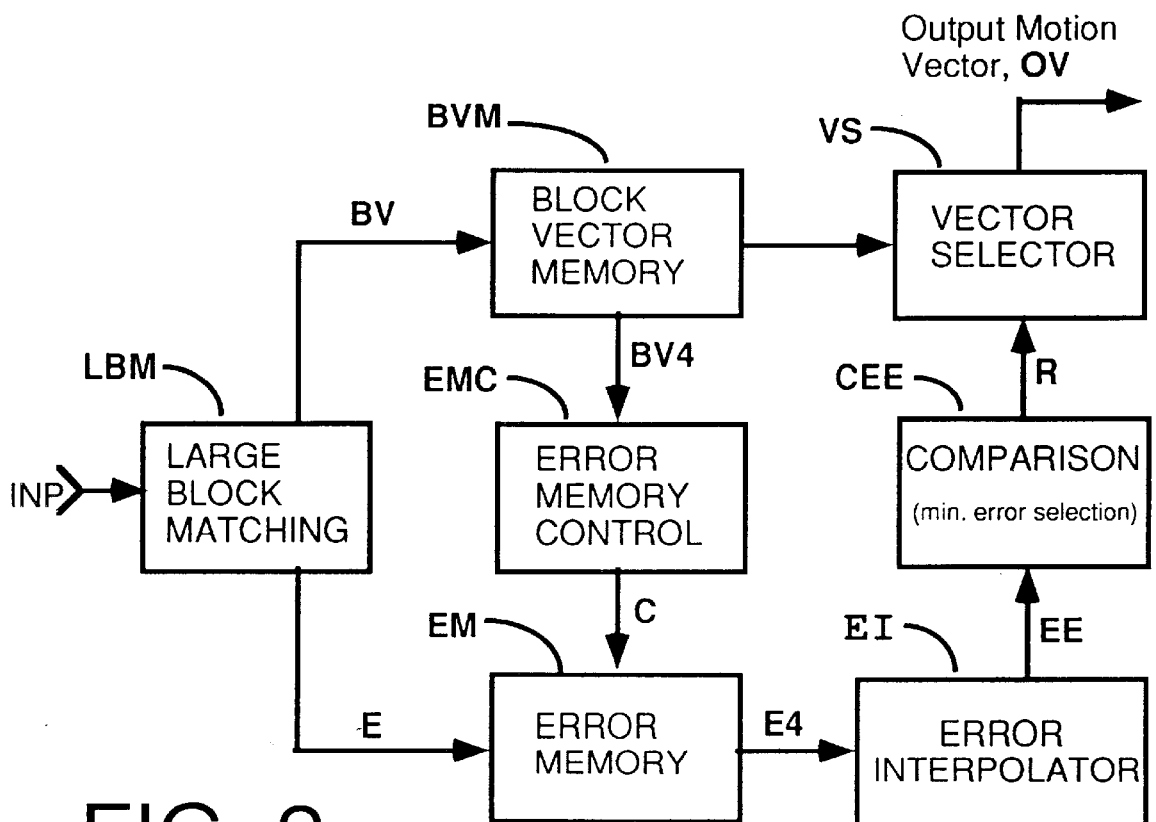
FIG. 2 is a block diagram of apparatus embodying the invention providing localization by error interpolation.

FIG. 2 is a block diagram of a suitable hardware implementation providing localization by error interpolation. Large-block matching means LBM, receiving the input signal INP, produces for each candidate motion vector and for each block, errors E, which are stored in an error memory EM, together with block motion vectors BV, which are stored in a block vector memory BVM and for which the error is a minimum in each block. Motion vectors BV4 from the memory BVM are used in sets of four to control (C) via error memory control means EMC access to the corresponding error values over four blocks which are stored in error memory EM. These errors E4 form the input to an error interpolator EI which calculates estimated errors EE, pixel by pixel. Finally, the four estimated errors for each pixel are compared in comparing means CEE and the minimum R is used to select in vector selecting means VS from the motion vectors BV the output motion vector OV for that pixel. An advantage of this embodiment is that it retains good noise performance.

Advantageously, this embodiment of the invention provides good noise performance.

Localization by Vote-counting

This embodiment works by first performing the 'block matching' operation on each pixel using a block size of one pixel only and comparing only the four vectors allowed for the pixel. This can be thought of as giving each pixel a 'vote' for one of the four vectors. On its own, this operation introduces an unacceptable number of spurious vectors, so it is followed by an adjustment of the boundaries between motion vectors. An example of the operation of this embodiment is given in FIG. 3.

Figure 1:
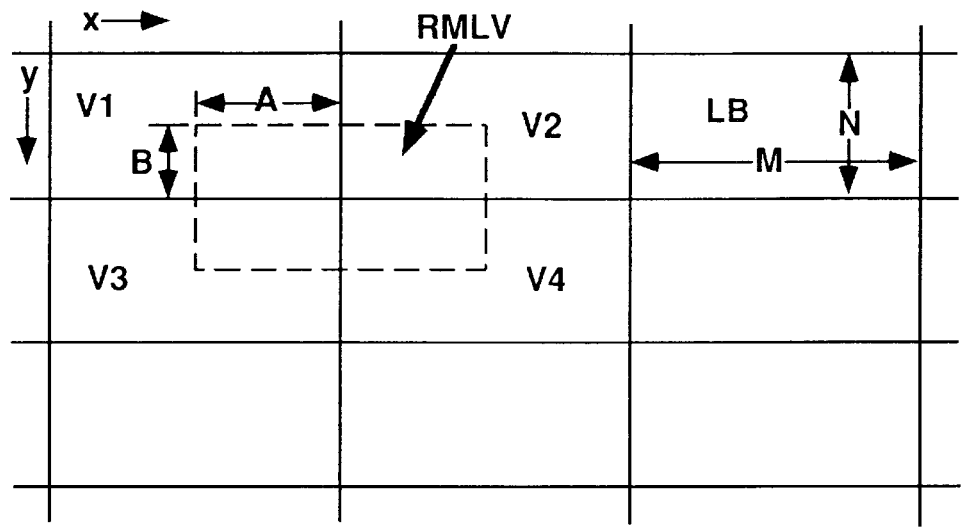
FIG. 1 is a diagram illustrating possible motion vectors for localization.
Figure 3:
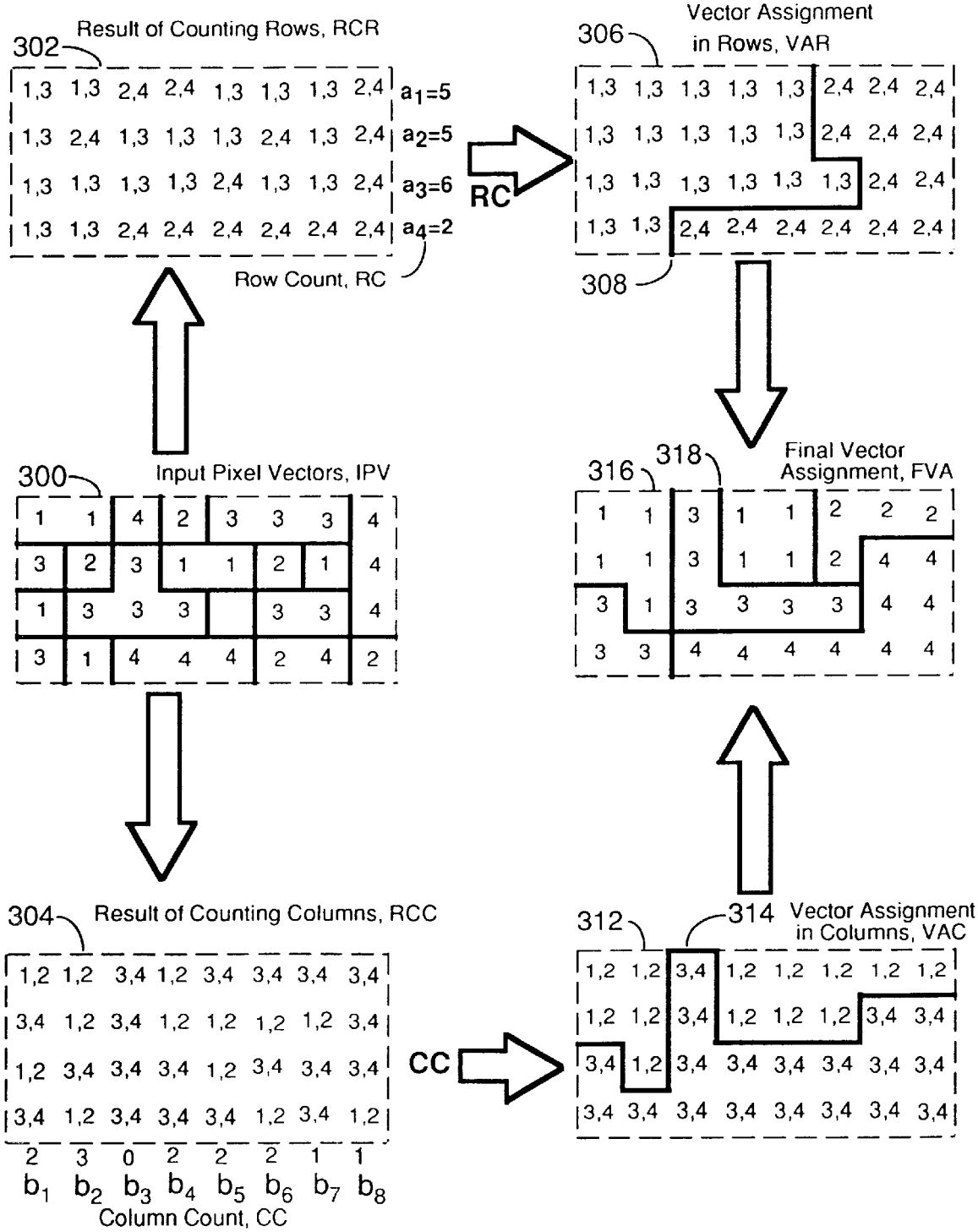
FIG. 3 is a diagram illustrating a method embodying the invention providing localization by vote counting.

In FIG. 3, within each row of the block-sized area marked by the dotted line in FIG. 1 (input pixel vectors IPV), the number of choices for vectors from the two blocks on the left ($V_1$ and $V_3$, result of counting rows RCR) is counted. If the result (row count RC) is 'a', say the decision is made that the 'a' leftmost pixels in the row will be given motion vectors $V_1$ or $VP_3$ and the (M−a) rightmost pixels $V_2$ or $V_4$ (vector assignment in rows VAR). (Note that in the figure a comma ',' between vectors represents "or").

Similarly, within each column, the number of choices from the upper pair of vectors ($V_1$ and $V_2$, result of counting columns RCC) is counted (column count CC). If the result is 'b', it is decided that the 'b' uppermost pixels in the column will be given motion vectors $V_1$ or $V_2$ and the (N−b) lowest pixels $V_3$ or $V_4$ (vector assignment in columns VAC). (here also, "or" between vectors is represented by a comma (,). After both the rows and columns have been looked at in this way, every pixel has two decisions which together define a unique motion vector for the pixel (final vector assignment FVA) by forming areas in which both decisions (VAR and VAC) contain the same kind of vector. Keep in mind in interpreting FIG. 3 that '1,3' means '1 or 3', '2,4' means '2 or 4', etc.

Figure 4:
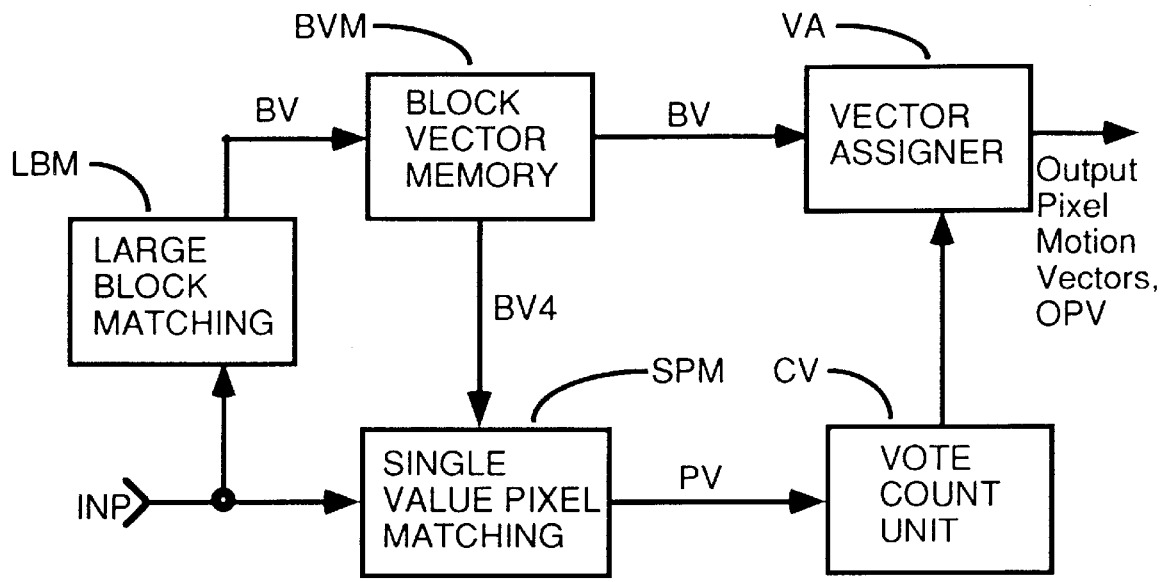
FIG. 4 is a block diagram illustrating apparatus embodying the invention for providing localization by vote counting.

FIG. 4 is a block diagram of a suitable hardware implementation of localization by vote counting. Large-block matching means LBM receiving the input signal INP and produces for each block of INP the block vectors BV, which are stored in a block vector memory BVM. Single-pixel matching means SPM receive the input signal INP and evaluate sets of four block vectors BV4 received from block vector memory BVM. The resulting single-pixel vectors PV (the 'votes') are stored in vote count means CV and are reassigned in a vector assignor VA using the block vectors BV from memory BVM, according to the counting algorithm described above, to provide the final output pixel vectors OPV.

Advantageously, localization by vote counting also retains good noise performance. Moreover, it is quite simple in hardware because the secondary, single-pixel search requires only four comparisons per pixel. The process of counting votes across rows and columns can be generalized to take into account the magnitudes of the errors resulting from the single-pixel 'block matching' process.

Localization by Subblock Matching

This method also uses matching of smaller blocks, but here a compromise is made between the reliability of larger blocks and the need for a pixel-based motion vector field. Block matching is performed using small blocks, typically 2×2, again comparing only the four vectors relevant to the small block (or 'subblock'). The resulting motion vector field is much more reliable then that resulting from a search using single pixels, but there is a slight penalty in that the localization is coarser.

With a subblock size of 2×2, there is some benefit in following the subblock search with post-processing to remove the occasional spurious result, especially if the input picture is noisy. An processor particularly suitable for this purpose, in accordance with a feature of the invention, comprises a median filter, using a window of 3 subblocks by 3 subblocks, on each component of the motion vector separately. This is a fairly simple process but has a slight potential disadvantage that the output motion vectors might not be one of the nine vectors on the window from which the median is taken. This disadvantage is not severe, especially if the vertical motion vector range is small, but it can be overcome by using a 3×3 'vector median' filter on the motion vectors, as described in "An overview of median and stack filtering" GABBOUJ, M. et al, 1991, Circuits Systems Signal Processing, Vol 11, No 1, 1992.

Simulations have shown that localization by subblock searching, followed by 3×3 median filter on each component, gives a closer approximation to the true motion field than either of the other two embodiments. In most architectures it is also likely to be the simplest to implement in hardware, but the other embodiments may prove simpler to implement or to have better performance in certain applications.

Figure 5:
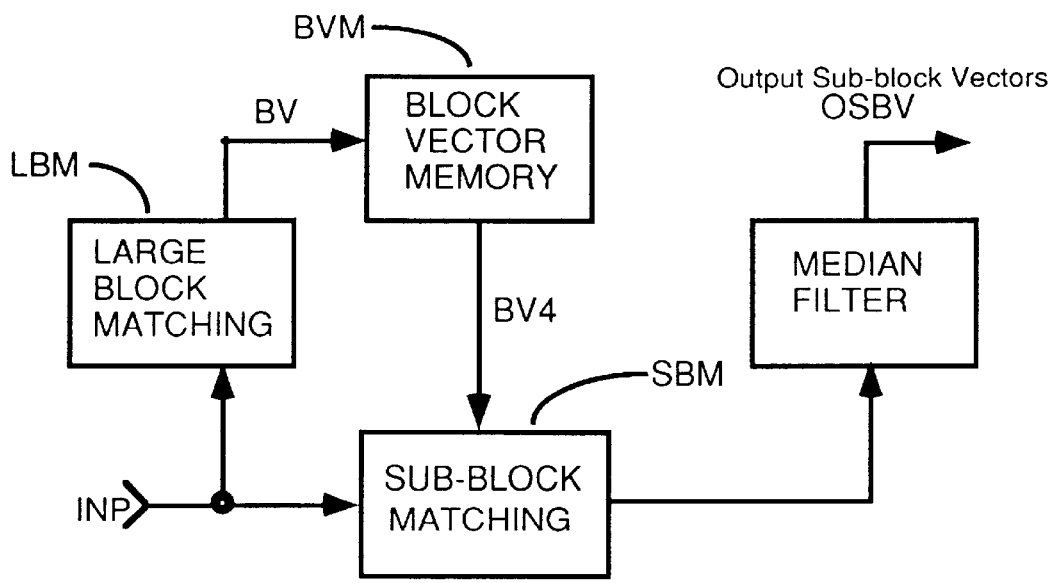
FIG. 5 is a block diagram illustrating apparatus embodying the invention for providing localization by subblock matching.

FIG. 5 is a block diagram of a suitable implementation of localization by subblock matching. Large-block matching means LBM receiving the input signal INP produce, for each block, block vectors BV, which are stored in a block vector memory BVM. Subblock matching means SBM receive the input signal INP and evaluate sets of four vectors BV4 received from block vector memory BVM. The resulting subblock vectors SBV which have been selected in SBM with respect to the minimum subblock error are median filtered in filter means MF to produce the final output subblock vectors OSBV.

What is claimed is:

1. Apparatus, for providing motion estimation using block matching, comprising:

large-block matching means for receiving a picture signal and producing block motion vectors, each corresponding to a block of pixels, and related block errors;

memory means which store said block motion vectors and said errors;

error estimation means, in particular linear error interpolation means, which operate on stored error values corresponding to each four related block motion vectors which comprise the motion vector of a current block and the motion vectors of three blocks adjacent to said current block and which calculate for each pixel in said current block estimated errors, taking into account the position relative to a center point of the corresponding block including said pixel;

comparing means which take the minimum of said estimated errors for each pixel; and selecting means for selecting in relation to said minimum the respective of said four block motion vectors as a final motion vector for the current pixel wherein said final motion vector for the current pixel included within the current block can be different than the final motion vector for another pixel also included within the current block.

2. Apparatus, for providing motion estimation using block matching, comprising:

large-block matching means for receiving a picture signal and producing block motion vectors, each associated with a corresponding block of pixels;

memory means for storing said block motion vectors;

pixel matching means for comparing each four of the stored block motion vectors comprising the motion vector of a current block and the motion vectors of three blocks adjacent to said current block;

first counting means for counting along rows of a subblock smaller than a block the number of vector choices from two left sided blocks or respectively the number of vector choices from two right sided blocks and for assigning to each pixel of the subblock the vector signs of two left sided neighboring blocks or two right sided neighboring blocks and for reordering the vector signs for each pixel in the subblock, to form groups of identical vector types in such a way that the vector signs of the two left sided neighboring blocks are on the left side of the subblock and the vector signs of the two right sided neighboring blocks are on the right side of the subblock;

second counting means for counting along the columns of a subblock smaller than said block the number of vector choices from two upper sided blocks or respectively the number of vector choices from two lower sided blocks and for assigning to each pixel of the subblock the vector signs of two upper sided neighboring blocks or two lower sided neighboring blocks and for reordering the vector signs for each pixel in the subblock to form groups of identical vector types in such a way that the vector signs of the two upper sided neighboring blocks are on the upper side of the subblock and the vector signs of the two lower sided neighboring blocks are on the lower side of the subblock; and assigning means for selecting for each pixel of the subblock the vector sign which is assigned to a pixel according to previous reorderings for defining a unique motion vector for each pixel, selected from the corresponding block motion vectors wherein said unique motion vector for a given pixel included within a particular block can be different than the unique motion vector for another pixel also included within the particular block.

3. Apparatus, for providing motion estimation using block matching, comprising:

large-block matching means for receiving a picture signal and producing block motion vectors each associated with a corresponding block of pixels, each said block comprising a plurality of subblocks;

memory means for storing said block motion vectors;

subblock matching means for comparing sets of four of the stored block motion vectors, that is the motion vector of the current block and the motion vectors of the three adjacent blocks, to select vectors having a minimum subblock error; and combining means, in particular median filter means, which generate a dominant subblock vector for each pixel of a current subblock from said selected vectors, wherein said dominant subblock vector for a given pixel included within a particular subblock can be different than the dominant subblock vector for another pixel also included within the particular subblock.

4. A method for motion estimation using block matching, wherein motion vectors related to blocks of pixels are calculated, the blocks having a predetermined size, and wherein from the motion vectors for adjacent blocks a single motion vector is calculated, comprising the following steps:

dividing a picture into a such a multiplicity of blocks that at least one block is surrounded at each side by adjacent blocks;

performing for the blocks a block matching in order to determine individual block motion vectors, each corresponding to a particular block of pixels;

calculating for each pixel of a current block an individual pixel motion vector using in each case for a current pixel the block motion vector for the current block and the block motion vectors for the three adjacent blocks, defining four block motion vectors, which are nearest to that portion of pixels of the current block to which the current pixel belongs, wherein said individual pixel motion vector can be different from said block motion vector associated with the current block, and wherein each pixel in said current block can have a different pixel motion vector than another said pixel in the current block.

5. A method according to claim 4, wherein for any pixel, from error values related to the block motion vectors of said current block and said three blocks adjacent to said current block, several estimated errors are calculated, taking into account the position of the pixel relative to a center point of the corresponding block including said pixel, whereby the minimum of said estimated errors is taken to select one of said four block motion vectors as the final motion vector for said pixel.

6. A method according to claim 5, characterized in that said estimated errors (EE) are calculated (EI) using linear interpolations.

7. A method according to claim 4, wherein in addition, for each subblock smaller than said each block, a subblock matching is performed by comparing said four block motion vectors relevant to the subblock and selecting one with respect to a minimum subblock error, thereafter generating a resulting subblock vector for each subblock by combining a predetermined number of the selected subblock vectors.

8. A method according to claim 7, characterized in that said combining is a median filtering (MF).

9. A method according to claim 4 characterized in that said block matching is carried out on subsampled pictures.

10. A method according to claim 4 characterized in that said block matching is a two-sided block matching.

11. A method according to claim 4 further comprising:

that for each subblock of said block being smaller than said block, a subblock matching is performed by comparing said four block motion vectors and the following steps:

counting along rows of the subblock the number of vector choices from two left sided blocks or respectively the number of vector choices from two right sided blocks;

counting along the columns of the subblock the number of vector choices from two upper sided blocks or respectively the number of vector choices from two lower sided blocks;

assigning to each pixel of the subblock the vector signs of two left sided neighboring blocks or two right sided neighboring blocks;

assigning to each pixel of the subblock the vector signs of two upper sided neighboring blocks or two lower sided neighboring blocks;

reordering the vector signs for each pixel in the subblock, to form groups of identical vector types in such a way that the vector signs of the two left sided neighboring blocks are on the left side of the subblock and the vector signs of the two right sided neighboring blocks are on the right side of the subblock;

reordering the vector signs for each pixel in the subblock to form groups of identical vector types in such a way that the vector signs of the two upper sided neighboring blocks are on the upper side of the subblock and the vector signs of the two lower sided blocks are on the lower side of the subblock; and selecting for each pixel of the subblock the vector sign which is assigned to a pixel according to previous reordering steps.

* * * * *